United States Patent [19]

Sang, Jr. et al.

[11] Patent Number: 5,144,472
[45] Date of Patent: Sep. 1, 1992

[54] ELECTRICAL CONTACTS FOR AN ELECTRO-OPTIC MODULATOR

[75] Inventors: Henry W. Sang, Jr., Cupertino; Mark S. Bernstein, Belmont; Michael A. Berkovitz, Sebastopol, all of Calif.

[73] Assignee: Xerox Corporation, Stamford, Conn.

[21] Appl. No.: 525,280

[22] Filed: May 17, 1990

[51] Int. Cl.⁵ .................................................. G02F 1/03
[52] U.S. Cl. .................................... 359/254; 359/245; 359/246
[58] Field of Search ............. 350/353, 355, 356, 374; 228/180.1, 180.2, 188; 359/245, 246, 254, 259

[56] References Cited

U.S. PATENT DOCUMENTS

| 4,367,925 | 1/1983 | Sprague et al. | 350/356 |
| 4,369,457 | 1/1983 | Sprague et al. | 350/356 |
| 4,712,857 | 12/1987 | Lee | 350/356 |

FOREIGN PATENT DOCUMENTS 2134026 8/1984 United Kingdom ............... 228/188

Primary Examiner—Rolf Hille
Assistant Examiner—Tan Ho
Attorney, Agent, or Firm—Townsend and Townsend

[57] ABSTRACT

A contact structure and method of formation of a contact structure for an electro-optic modulator. Linear electrodes on a modulator crystal are covered with a dielectric layer. The electrodes are contacted by way of one or more vias through the dielectric layer. Contact pads are formed over the vias so as to contact the electrode and extend over several adjacent electrodes, providing significantly greater contact area for a driver chip applied to the modulator crystal.

21 Claims, 4 Drawing Sheets

ELECTRICAL CONTACTS FOR AN ELECTRO-OPTIC MODULATOR

BACKGROUND OF THE INVENTION

The present invention is related to the field of electrical connections. In particular, one embodiment of the present invention provides an improved method and apparatus for making electrical contacts to an electro-optic modulator.

Optical modulators are well known to those of skill in the art and are commonly used to modulate light in a variety of applications including, for example, laser scanning for non-impact printing, transmission of data in optical fibers, screen displays, film exposure, optical reading equipment, optical fourier transform generators, and the like. Many optical modulators operate by passing a light beam, usually a monochromatic coherent beam of light, into or through a crystal. An electrical field is imposed on the crystal via, for example, a set of electrodes on a surface of the crystal. The electrical field varies optical properties of the crystal such its index of refraction. As the index of refraction of the crystal varies, the crystal modulates the light in a desired manner through variation of the electrical field.

One such optical modulator is described in greater detail in, Sprague et al., "Linear Total Internal Reflection Spatial Light Modulator For Laser Printing," SPIE Vol. 299 (1982) which is incorporated by reference herein for all purposes. Related modulators are described in U.S. Pat. Nos. 4,391,490, and 4,718,752, which are also incorporated by reference herein for all purposes.

While prior art crystals have met with significant success, substantial problems still remain. For example, the electrical field in the modulator disclosed in Sprague et al. is imposed by electrodes on a driver crystal which are mechanically engaged to the modulator crystal. This arrangement provides for poor contact to the modulator crystal and, therefore, poor response characteristics.

As an alternative to direct mechanical engagement of linear electrodes on the driver chip to the modulator crystal, linear electrodes could be formed on both the driver chip and the modulator crystal and subsequently pressed together. Long electrodes would provide a long interaction region for light and ease alignment problems. The use of matching linear electrodes on both the driver chip and modulator crystal also presents difficulties however. For example, since a large number (2–50,000 and commonly 500–10,000) of the control electrodes are required on the modulator crystal and since the electrodes are of necessity very small (on the order of 1 to 10 microns wide) and separated by a very small distance (also on the order of 1 to 10 microns) it is exceedingly difficult to properly align the integrated circuit driver chip electrodes to the crystal electrodes and often the electrodes of the driver chip would be crossed with the electrodes of the underlying crystal, resulting in unsatisfactory device performance.

Additionally, any asperites from contamination or localized non-uniformity in substrate processing when mechanically compressed form pressure-induced variations in optical field properties which conflict with the uniform operation of the modulation device. Further, the small size of the electrodes renders them easily damaged, destroyed, or electrically shorted to other electrical contacts in the process of forming the compression fitting. Still further, the linear arrangement of the electrodes results in either a very long, narrow driver chip (which becomes difficult to produce and, therefore, excessively expensive) or the need to apply multiple driver chips (which dramatically increases the magnitude of the alignment problems). Still further, matching linear electrodes could not practically be repaired due to the damage incurred in un-seating and re-seating the small electrodes. Still further, the matching linear electrode arrangement would result in the need for a cantilevered driver chip design in order to provide an interface to the outside world. The cantilevered arrangement would often result in chip breakage, and the like. Of course, even when such linear electrodes are properly aligned, the coefficient of thermal expansion of the silicon driver chip and the crystal differ by a significant amount and when heated the electrical contacts may be displaced sufficiently to destroy electrical contacts, or short to neighboring electrodes, or smear the metal electrodes on either or both the driver chip and the crystal.

From the above it is seen that an improved electrical contact for an optical modulator and method of forming electrical contacts on an optical modulator are desired.

SUMMARY OF THE INVENTION

An improved electrical contact for an optical modulator and method for forming contacts on an electro-optical modulator are disclosed. The modulator includes a crystal onto which a plurality of electrodes are formed. In many modulators the electrodes will take the form of metal strips on the surface of the crystal and the metal strips will have a very high aspect ratio. A dielectric layer is formed on the electrode surface and provided with vias or apertures extending to a surface of the dielectric layer. The via for each electrode is offset from the via of the next electrode to provide a separation between adjacent vias. Contact metal is formed over the contact via and extends over adjacent electrodes, providing greater surface area for contact with the electrodes from a driver chip. Optionally, solder bumps and barrier metal layers are also provided.

Accordingly, in one embodiment the invention provides a modulator for varying at least one characteristic of light passing through the modulator. The modulator includes a crystal, the crystal responsive to application of an electric field thereon so as to change at least one optical property of the crystal; a plurality of high aspect ratio electrodes on the crystal, the electrodes having a first spacing therebetween; a dielectric layer over the plurality of electrodes, the dielectric layer comprising: i) an upper surface; and ii) at least one aperture extending from the surface to each of the plurality of electrodes. The modulator further includes one or more conductive metal layers extending through each of the apertures and across the upper surface over at least one adjacent electrode, forming a pad. The pad may be, for example, circular. The conductive metal regions are contacted by, for example, linear electrodes on a driver chip through mechanical engagement, attachment by way of soldering, asymmetrical contact mats, or the like.

A method of forming electrical contacts for an optical modulator crystal is also disclosed and includes the steps of, on the modulator crystal, forming a plurality of high aspect ratio electrodes on a surface thereof; forming a dielectric layer on the surface; forming at least one aperture in the dielectric layer for each of the electrodes, the apertures having a width less than about a width of the electrodes where the apertures contact the electrodes; forming a metal layer on the dielectric layer, the metal layer extending through the apertures to contact the electrodes; etching the metal layer to form a bonding pad associated with each of the apertures, the bonding pads extending along a surface of the dielectric layer over at least one adjacent electrode.

The invention herein provides a variety of benefits including greatly simplified alignment. A good measure of the difficulty which will be encountered in aligning electrodes of two chips is provided by way of the "critical angle" and "critical distance." Critical angle is defined herein as the angle at which two chips may be canted from perfect alignment before a short between two electrodes occurs. Critical distance is defined herein as the distance the two chips may be laterally displaced from ideal alignment before a short occurs. Through use of the invention herein the critical angle is increased according to one embodiment from about 0.6 degrees to about 4.7 degrees. According to the same embodiment, the critical distance is increased from about 5 $\mu$m to 35 m. Obviously these numbers will be application dependent; the particular example provided herein assumes 10 $\mu$m $\times$ 0.5 mm lines and 2376 lines with 7 pads per row. These differences will significantly impact the commercial manufacturability of, for example, electro-optic modulators and moves alignment problems from the realm of very difficult to the realm of readily achievable.

A greater understanding of the invention may be had by way of reference to the description below along with the appended drawings.

DETAILED DESCRIPTION OF THE INVENTION

Contents

| CONTENTS |
| --- |
| I. Description of the Contact Structure |
| II. Description of a Method of Forming the Contact Structure |

I. Description of the Contact Structure

Figure 1:
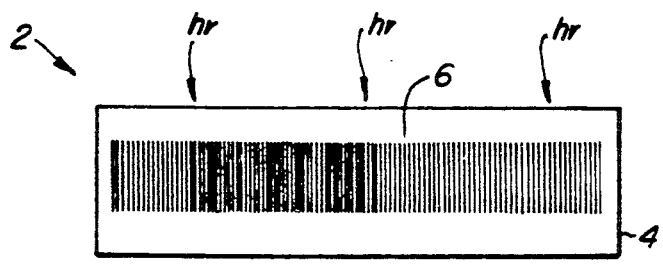
FIG. 1 is a top view of a modulator crystal.

FIG. 1 is a top view of a conventional electro-optic modulator 2 of the type well known to those of skill in the art. The modulator includes a crystal body 4 which may be, for example, lithium niobate (LiNbO$_3$), lithium tantalate (LiTaO$_3$), BSN, KDP, KD$_x$P, Ba$_2$NaNbO$_{15}$, PZLT, or other materials which are responsive to electrical fields so as to modify their electrical properties. The top of the crystal is provided with a large number of substantially linear electrodes 6 which may be, for example, aluminum, chromium, titanium, molybdenum, gold, or the like. In an alternative embodiment the electrodes comprise a dual or multiple layer of metal, the first layer being, e.g., chromium for adhesion to the crystal and to act as a barrier metal, and a second layer of, for example, aluminum, to serve as a contact metal. A separate metal layer may be provided to act as a barrier metal. Cap metals may also be provided in some embodiments.

Each of the linear electrodes 6 are parallel over all or a substantial portion of their length and have a high aspect ratio (e.g., of the order of about 10:1 to 10000:1 and most commonly and between about 50:1 and 150:1). For example, the electrodes 6 may have a width of about 0.1 microns to 10 microns, a length of about 0.1 millimeters to 10 millimeters. The electrodes are separated by a distance of about 0.1 microns to 100 microns. In preferred embodiments the electrodes have a width of about 5 microns, a length of about 0.5 millimeters and are separated by a distance of about 5 microns (i.e., the lines have a center to center distance of about 10 microns).

Most modulators have a large number of electrodes for precise control of a light beam passing through the crystal. For example, in some embodiments the crystal is provided with about 100, 1000, 2000, 3000, 4000, 5000, 10,000 or more such electrodes. According to a preferred embodiment the modulator is provided with a set of 4736 electrodes.

In operation, collimated, monochromatic light (indicated by hv) enters the crystal 4 and passes through the crystal in the vicinity of the electrodes. Voltages are selectively applied to electrodes 6 under the control of a driver chip or integrated circuit (which is not shown in FIG. 1). As a voltage is applied to the electrodes the index of refraction of the crystal is modified in the region of the electrode, thereby altering a phase front of the light. The modulated light beam exiting the modulator may be used in a wide variety of applications including, for example, laser printers, video displays, data transmission, image transmission, or the like. Operation of one electro-optic modulator is described in detail in Sprague et al., previously incorporated by reference.

Figure 2A:
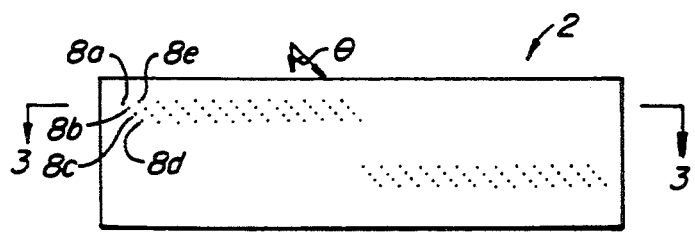
FIG. 2a is a top view of a modulator crystal provided with a contact structure according to one embodiment of the invention.
Figure 2B:
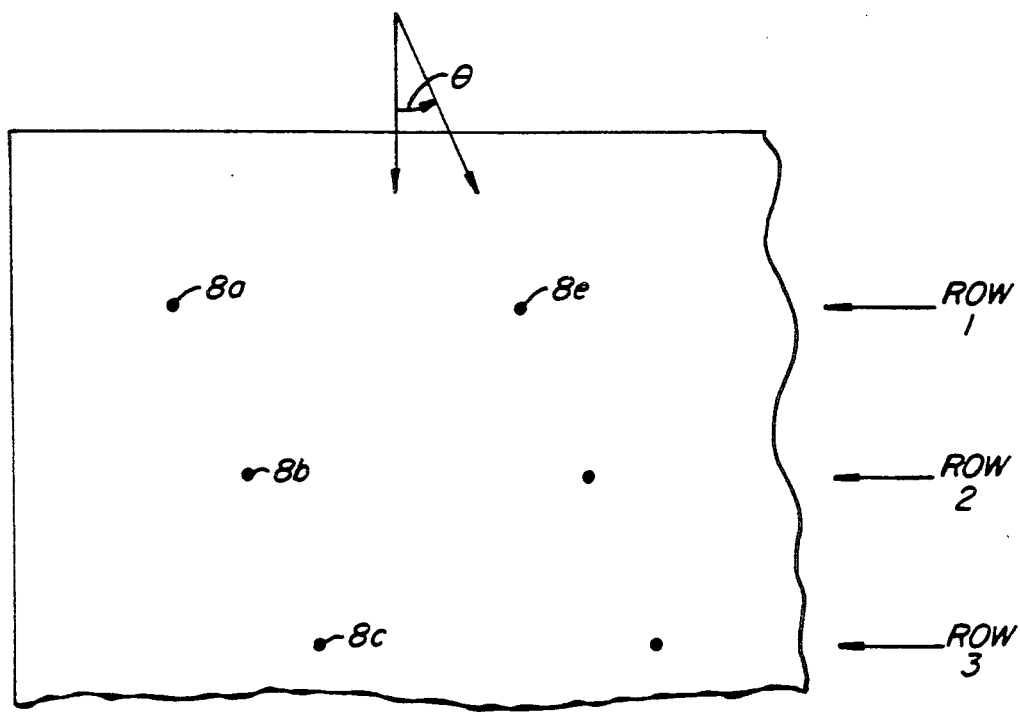
FIG. 2b illustrates the upper left hand portion of the crystal in greater detail.

FIG. 2a is a top view of a modulator 2 according to one embodiment of the invention after fabrication of a contact structure thereon. FIG. 2b illustrates the upper left hand corner of the modulator in greater detail. For each electrode stripe on the crystal, a corresponding contact pad 8 is provided. According to a preferred embodiment the pads 8 are arranged in a staggered fashion such that the bonding pad 8b (which is preferably circular) associated with the second electrode is displaced slightly to the right and downwards from the bonding pad 8a associated with the first electrode, the bonding pad 8c for the third electrode is displaced slightly to the right and downwards from the bonding pad 8b for the second electrode, and so on. According to preferred embodiments, the pads lie along lines displaced by an angle (illustrated by theta) of about 1 to 30 degrees from lines formed by the electrodes with a preferred range of about 5 to 15 degrees.

By arranging the contact pads in as shown in FIG. 2, pads may be utilized which have a significantly greater diameter than the underlying electrode line width. Among other advantages, this greatly simplifies alignment of driver chips. For example, a crystal provided with 5 micron electrode lines on 10 micron centers may readily be provided with bonding pads which have a diameter of 35 microns and 70 microns center to center spacing. In preferred embodiments the diameter of the bonding pads (as viewed from above) is about 2 to 20 times the width of the electrodes, with a range of about to 5 to 8 preferred.

According to a preferred embodiment the bonding pads for periodic electrodes are provided in the same row (where a row is taken to herein to be a line perpendicular to the electrodes and a column is taken to be a line parallel to the electrodes). For example, in the embodiment shown in FIGS. 2a and 2b, the bonding pads for the 1st, 5th, and 9th . . . electrodes are in the first row; the 2nd, 6th, and 10th electrodes are provided in the second row, etc. In general, the bonding pad for every n*i'th electrode is provided in the same row (where n is an integer and i is a counter representing an electrode number), the bonding pad for every n*i+1'th electrode is provided in the same row, etc. By staggering the bonding pads in the manner shown, the contact region may occupy only a small portion of the crystal area while providing greater contact integrity, i.e. this arrangement provides maximum packing density with maximum nearest neighbor distance.

According to one preferred embodiment, the spacing between bonding pads is approximately equal to the diameter of the bonding pads. The preferred bonding pad diameter is then determined from the equation:

$$x = \sqrt{A/C}$$

where:
    x is the binding pad diameter/spacing between pads;
    A is the area available for the binding pads; and
    C is the number of binding pads.

According to further alternative embodiments, the contact pads for different regions of the crystal are displaced on the crystal permitting, for example, the use of separate driver chips for different regions of the crystal. For example, in the embodiment shown in FIG. 2, the bonding pads for the electrodes in the left half of the crystal are placed in the upper left hand portion of the crystal while the bonding pads for the right half of the crystal are placed in the lower right hand portion of the crystal. The use of multiple driver chips permits, for fabrication of chips with greatly reduced area and reduced aspect ratios which, as a general rule, will cost significantly less to fabricate. At the same time, alignment difficulties are substantially decrease and repair of the device becomes readily possible since the driven chip can be replaced without destroying the modulator contacts.

Figure 3:
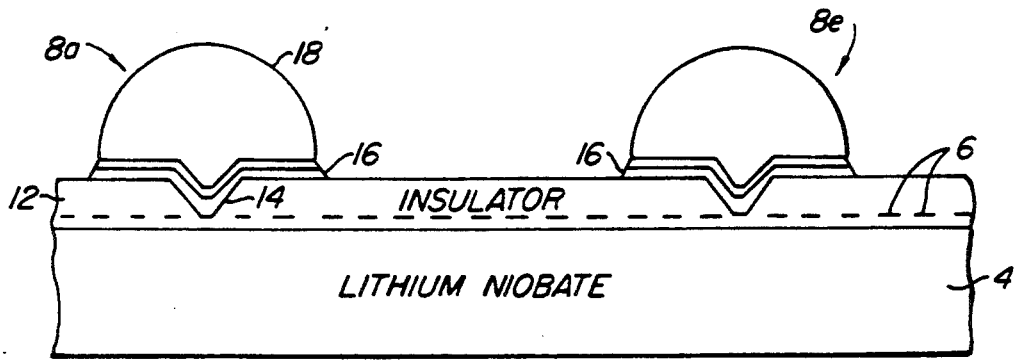
FIG. 3 is an enlarged cross-sectional side view of a portion of an electro-optic modulator with a contact structure.

FIG. 3 illustrates a small portion of the modulator 2 in cross section through contact pads 8a and 8e according to a preferred embodiment. Electrodes 6 extend into and out of the plane of the figure on the surface of the lithium niobate crystal 4. A dielectric layer 12 of, for example, polyimide, silicon nitride (Si$_3$N$_4$), silicon dioxide (SiO$_2$), or the like is provided above the electrodes. According to preferred embodiments the dielectric layer is formed through the application of multiple layers of dielectric material(s) for pin hole protection.

A pattern of apertures 14 is provided in the insulating layer. The sidewalls of the insulation layer are preferably sloped as a natural result of the etching process. Metallization layer 16 is patterned to define contact pads on the surface of the dielectric layer. The contact pads may be in any desired shape but are preferably circular or rectangular in shape and will generally be chosen to take advantage of a preferred etch geometry.

According to a preferred embodiment the contact metal 16 is formed in two layers. The bottom layer is preferably a material which will provide good interlayer contact, act as a diffusion barrier to impurities, and adhere to the dielectric. Included among such materials are TiW, Ti, Cr, TiN, refractory metals, metal silicides, heavily doped polysilicon, and the like. The second layer provides good crystal to chip contact and/or wetting metallization to solder. Included among such metals are Ni, Cu, Au, Ag, Sn, In, Pb, solder, and the like. The first layer is preferably about 75 to 1000 Å thick, and the second layer is about 1000 Å to 1 μm thick.

Solder bumps 18 are provided on metallization layer 16 for each of the contact pads 8. Solder bumps 18 may be, for example, deposited PbSn, electroless plated SnIn, In, Sn, or the like. Solder bumps 18 are preferably about the same height as diameter.

It will of course be recognized that while the invention is illustrated with regard to solder bumps on the crystal, the solder bumps could equally well be provided on the driver chip at selected locations. Alternatively, solder could be eliminated and conventional pressure contact could be utilized. Still further, anisotropic conductive pads could be beneficially utilized in some embodiments. For example, Raychem Corporation of Menlo Park, Calif. has several products which conduct perpendicular to the film plane which may be used in some embodiments.

Figure 4A:
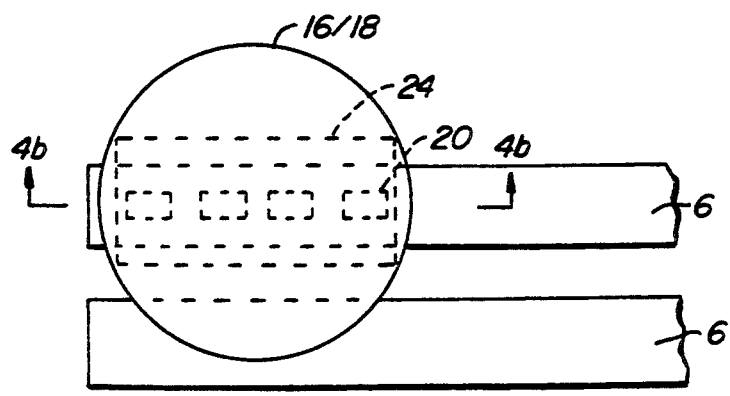
FIGS. 4a and 4b are more detailed top and cross-sectional side views of a contact pad according to an alternative embodiment of the invention.
Figure 4B:
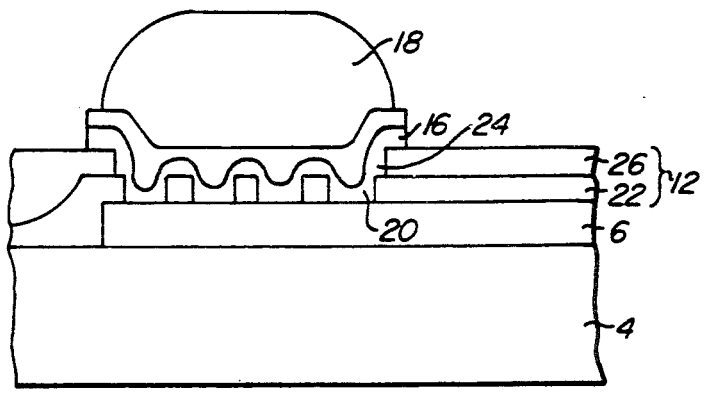

FIGS. 4a and 4b illustrate the structure shown in FIG. 3 according to an alternative embodiment in top view and cross section respectively. According to the embodiment shown in FIG. 4 first level vias or apertures 20 are provided through a first level dielectric 22. For 5 micron electrodes, the first level vias may be, for example, 3 micron by 8 micron rectangles. In general, the width of the vias will be slightly less than (e.g., about 10% to 30% less than) the width of the electrodes so as to allow for photolithographic alignment errors. The length of the vias will be chosen by to provide good etching definition which in most embodiments will mean that the length of the vias will be about 4 times the width of the vias. Multiple apertures 20 are provided for each electrode to provide good electrical contact and in a preferred embodiment 3 to 4 vias are provided for each electrode. The first level dielectric is preferably polyimide or silicon dioxide, with polyimide preferred for adhesion purposes Second level vias 24 are provided in a second level dielectric 26. The second level vias are preferably substantially larger than the first vias, but preferably do not extend over adjacent electrodes. For example, for the 5 micron electrodes shown in FIG. 4 the second level vias are preferably about 10 by 30 micron rectangles. A single second level via is provided for each electrode and encompasses all of the underlying first level vias.

As with the embodiment shown in FIG. 3, bonding pad metallization 16 is provided to fill the vias in the insulating layer(s) and solder bump 18 is provided above the bonding pad metallization layer. As shown in FIGS. 3, 4a and 4b, the bonding pad metallization and solder bumps may encompass an area that extends well over adjacent electrodes. For example, when 5 micron electrodes are utilized the bonding pad metallization and solder bump may be about 35–40 microns in diameter.

Figure 5:
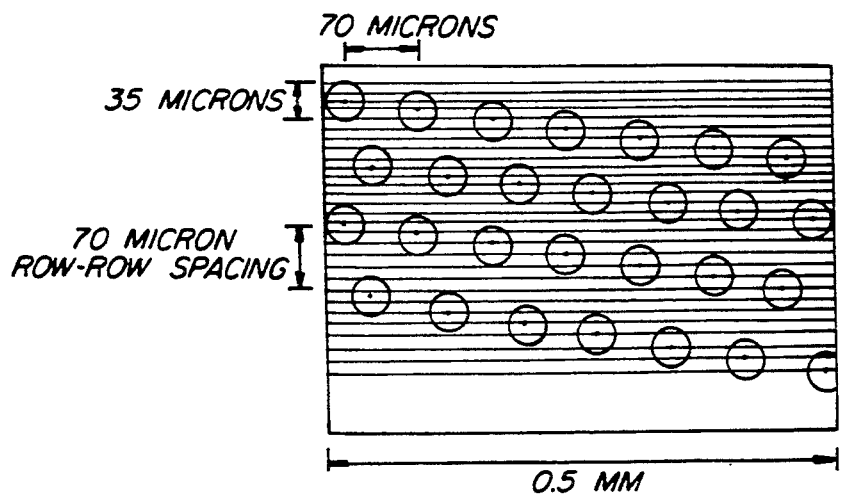
FIG. 5 schematically illustrates one arrangement of the contact pads in top view.

FIG. 5 illustrates in top view an alternative preferred layout of the electrode pads. The underlying electrodes are indicated by way of lines. This arrangement is generally in the form of a close packed hexagonal arrangement, although the lattice is slightly distorted because pads for adjacent electrodes are slightly displaced.

Figure 6A:
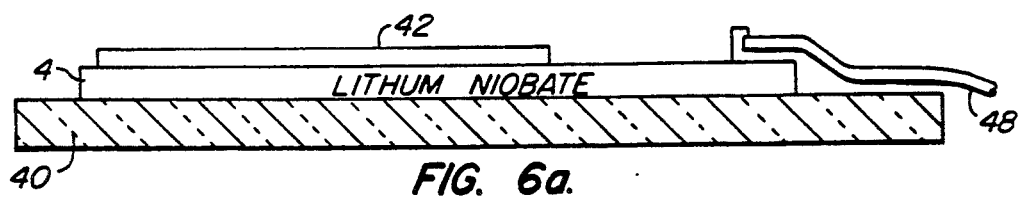
FIGS. 6a and 6b are side and top views respectively of a modulator bound to a driver chip.
Figure 6B:
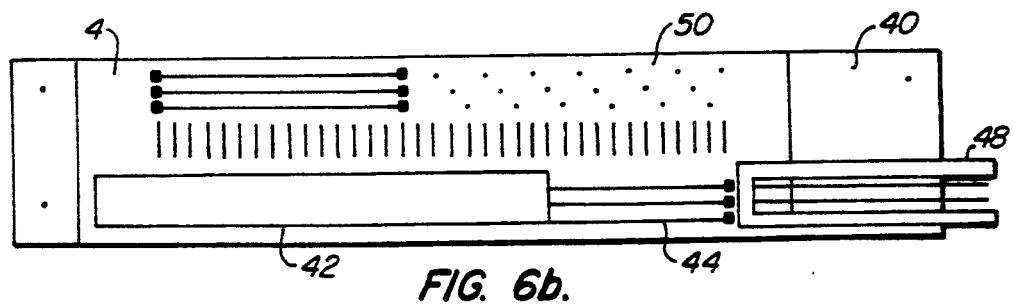

FIGS. 6a and 6b illustrate a modulator in a partially completed package in side and top views respectively. The lithium niobate crystal 4 is preferably mounted on a glass substrate 40. A driver chip 42 is bonded to solder bumps on the underlying crystal by way of heating the entire device so as to soften the solder and pressing the driver chip and the crystal together.

Trace lines 44 on the surface of the dielectric lead to a tab or wirebond connection 46 which connects to a cable 48 of the type well known to those of skill in the art. Also shown in FIG. 7b for the purposes of illustration is a set of pads to which a driver chip has not been bonded. A second driver chip would be bonded to the pads 50, wire boded to the trace lines, and the trace lines connected to a connector/cable in a manner similar to the chip shown therein.

II. Description of a Method of Forming the Contact Structure

Figure 7F:
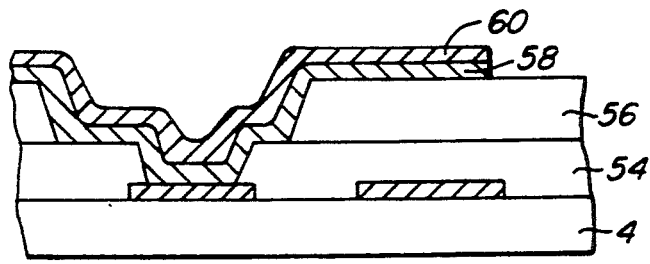
FIGS. 7a to 7g illustrate formation of a contact structure according to one embodiment of the invention.
Figure 7G:
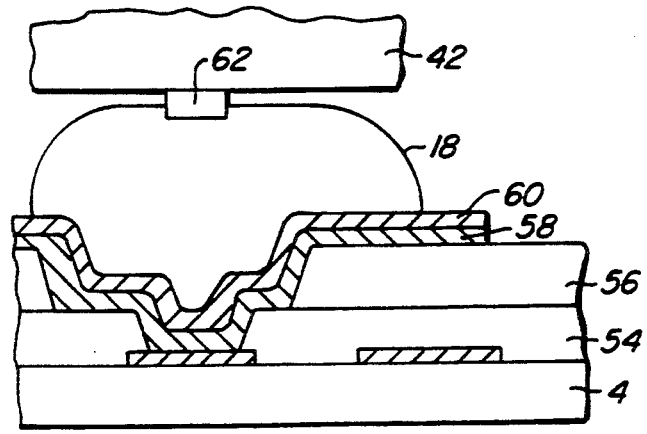
Figure 7A:
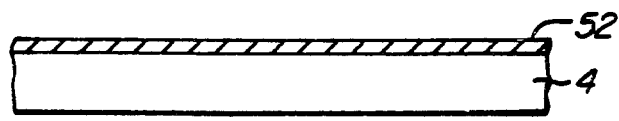
Figure 7B:
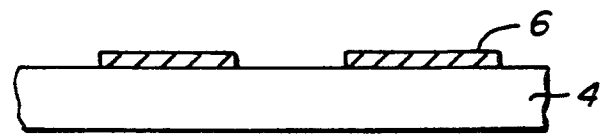

FIGS. 7a to 7g illustrate fabrication of the contact structure according to one aspect of the invention. In particular, FIG. 7a shows a cross section of a lithium niobate crystal 4. A metal layer 52 having a thickness of about 1 micron is deposited on the crystal by vacuum deposition or similar process like. According to some embodiments, a second metal layer is then applied, as shown in FIG. 4b. Thereafter, the metal is patterned by conventional lithography techniques so as to form electrodes on the surface thereof, resulting in the structure shown in FIG. 7b. In preferred embodiments, the electrodes have a width of about 5 microns.

Figure 7C:
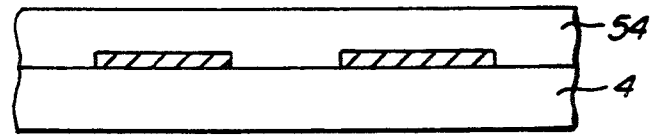

As shown in FIG. 7c, a first layer of dielectric material 54 is formed on the surface of the device having a thickness of between about 1000 Å and 1 μm depending upon the dielectric which is used. Preferably, the dielectric is thicker than the underlying metal. The dielectric layer may be, for example, polyimide, $SiO_2$ or the like.

Figure 7D:
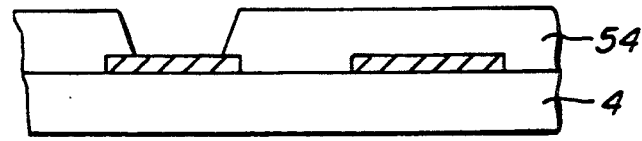

Thereafter, as shown in FIG. 7d, the first dielectric layer is patterned by conventional lithography techniques to form first level vias in contact with the electrodes. In preferred embodiments several vias (only one of which is shown in FIG. 7) are provided along the length of the electrode. The first level vias preferably have a width slightly less than the width of the electrodes to allow for alignment tolerances.

Figure 7E:
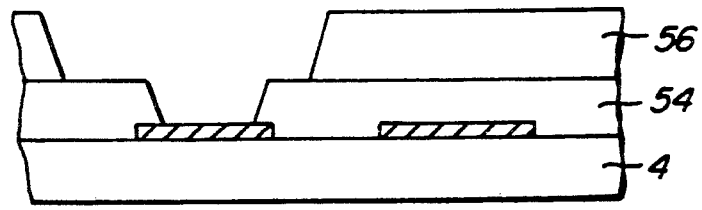

Thereafter, as shown in FIG. 7e, a second level dielectric is deposited across the surface of the device and patterned by conventional lithography techniques. In a preferred embodiment the second dielectric layer is polyimide, although other materials could be utilized. The second level dielectric preferably has thickness of between about 5000 Å and 2 μm with a thickness of about 1 μm preferred. The pattern of the second level dielectric is designed such that the apertures extend out to but not across the next underlying electrode in preferred embodiments so as to ensure that pin holes in the first dielectric layer do not permit contact of metal to adjacent electrodes.

Thereafter first and second metal interconnect layers are deposited across the surface of the device and patterned simultaneously, again with conventional lithography techniques. In preferred embodiments the first layer of metal 58 is TiW, Ti, Cr, TiN, refractory metals, metal silicides, heavily doped polysilicon, or the like. The second layer 60 provides good crystal to chip contact and/or wetting metallization to solder. The metal pads formed preferably extend well over adjacent electrodes so as to provide greater contact area. The pads are preferably circular when solder is to be applied.

Thereafter, as shown in FIG. 7g a solder bead is formed on the metal pad by conventional means such as vacuum deposition and etching or electroless deposition. The solder bead may be formed of PbSn, SnIn, In, Sn, or any one of a variety of other metals. Electrode 62 on driver chip 42 is attached to the solder bead by, for example, heating the entire modulator crystal to a temperature of about 157° C. for In so as to soften the solder, coarsely aligning the electrodes of the driver chip to those of the modulator, and pressing the driver electrode into the solder so as to form an electrical connection. Preferably this step is carried out in a reducing atmosphere. As seen from FIG. 7g, the electrode of the driver chip need not be precisely aligned so as to make effective contact to the underlying modulator electrode. In fact, the driver electrode could be displaced as far as the adjacent underlying electrode in some cases and still make effective electrical contact to the desired electrode.

It is to be understood that the above description is intended to be illustrative and not restrictive. Many variations in the invention will be apparent to those of skill in the art upon review of this disclosure. For example, while the invention has been illustrated primarily with regard to optical modulators, the invention is not so limited. The invention will also find use in other electrical connection schemes wherein a large number of electrical contacts must be made in a small area including, for example, acousto-optic modulators, and the like. Accordingly, the scope of the invention should be determined not with reference to the above description, but instead with reference to the appended claims, along with their full scope of equivalents.

What is claimed is:

1. A modulator for varying at least one characteristic of light passing through modulator comprising:
   a) a crystal, said crystal responsive to application of an electric field thereon so as to change at least one optical property of said crystal;
   b) a plurality of high aspect ratio electrodes contacting said crystal, said electrodes having a first spacing therebetween;
   c) a dielectric layer over said plurality of electrodes, said dielectric layer comprising:
      i) an upper surface; and
      ii) at least one aperture extending from said surface to each of said plurality of electrodes;
   d) a conductive metal region extending through each of said apertures and across said upper surface over at least one adjacent electrode.

2. The modulator as recited in claim 1 wherein said electrodes define columns, rows being perpendicular to said columns, and wherein each of said conductive metal regions is substantially centered in a different row than conductive metal regions associated with adjacent electrodes.

3. The modulator as recited in claim 2 wherein adjacent conductive regions lie along lines, said lines deviating from lines defined by said electrodes by about 2 to 20 degrees.

4. The modulator as recited in claim 2 wherein every 1+i*n'th conductive metal region lies in the same row where i is a counter and n is an integer greater than 1.

5. The modulator as recited in claim 4 wherein said conductive metal regions are provided in first and second grouped regions of said surface.

6. The modulator as recited in claims 1 or 5 wherein said electrodes have an aspect ratio greater than about 10:1.

7. The modulator as recited in claim 1 wherein said conductive metal regions have a width greater than about 2 times the width of said electrodes.

8. The modulator as recited in claim 1 wherein said conductive metal regions have a width of greater than about 7 times the width of said electrodes.

9. The modulator as recited in claim 1 further comprising a driver chip, electrodes of said driver chip bound to said metal regions.

10. The modulator as recited in claim 5 further comprising first and second driver chips, electrodes of said first driver chip bound to said conductive metal regions in said first region and electrodes of said second driver chip bound to said conductive metal regions in said second region.

11. The modulator as recited in claim 1 wherein said dielectric layer comprises a material selected from the group polyimide, silicon nitride, silicon dioxide, and combinations thereof.

12. The modulator as recited in claim 1 wherein said crystal is selected from the group $LiNbO_3$, $LiTaO_3$, BSN, KDP, $KD_xP$, $Ba_2NaNbO_{15}$, PZLT, and combinations thereof.

13. The modulator as recited in claim 1 wherein said conductive metal region comprises first and second layers, said first layer comprising a material selected from the group of TiW, Ti, Cr, TiN, refractory metals, metal silicides, and heavily doped polysilicon and said second layer comprising a metal selected from the group consisting of Ni, Cu, Au, Ag, Sn, In and Pb.

14. The modulator as recited in claim 1 wherein said conductive metal region further comprises a solder region, said solder region comprising a metal selected from the group of PbSn, SnIn, In, and Sn.

15. The modulator as recited in claim 1 wherein said dielectric layer comprises first and second layers of dielectric material, said first layer of dielectric material having apertures of a width less than said electrodes, said second layer of dielectric material having apertures with a width greater than said electrodes.

16. The modulator as recited in claim 15 wherein said apertures with a width substantially greater than said electrodes extend to a region at least about half way between adjacent electrodes.

17. The modulator as recited in claim 15 wherein said first layer of dielectric material is a material selected from the group of polyimide and $SiO_2$ and said second layer of dielectric material is polyimide.

18. The modulator as recited in claim 15 wherein each of said electrodes is provided with a plurality of said apertures of a width less than a width of said electrodes along its length, said apertures of a width substantially greater than said electrodes covering all of said plurality of said apertures.

19. The modulator as recited in claim 1 wherein said high aspect ratio electrodes comprise at least 100 substantially linear electrodes on a surface of said crystal, said substantially linear electrodes spaced apart by a distance of less than four times the width of said electrodes.

20. The modulator as recited in claim 19 wherein said electrodes have an aspect ratio of greater than about 100:1.

21. An electro optic modulator comprising:
a) a lithium niobate body;
b) at least 100 substantially linear parallel electrodes on a surface of said body, said electrodes spaced apart at a distance less than 4 times their width, said electrodes having an aspect ratio of greater than about 10:1, said electrodes comprising a first layer of chromium and a second layer of aluminum;
c) a dielectric layer over said electrodes and said body, said dielectric layer comprising at least one contact aperture for each of said electrodes, apertures for adjacent electrodes lying along lines, said lines arranged at an angle of between about 5 to 15 degrees from lines formed by said electrodes;
d) a metal contact pad extending through each of said apertures, said metal contact pads comprising first and second layers, said first layer selected from the group of TiW, Ti, Cr, TiN, refractory metal, metal silicide, and heavily doped polysilicon, said second layer comprising a material selected from the group of Ni, Cu, Au, Ag, Sn, In, and Pb;
e) a solder region on each of said contact pads; and
f) a modulator driver chip comprising a plurality of driver electrodes, each of said driver electrodes impressed into one of said solder regions.

* * * * *